United States Patent [19]

Kruse et al.

[11] Patent Number: 4,957,359
[45] Date of Patent: Sep. 18, 1990

[54] SPRING BIASED MIRROR ASSEMBLY WITH ELECTROMAGNETIC RELEASE MEANS

[75] Inventors: James W. Kruse, New Haven; Donald E. Riley, Ft. Wayne, both of Ind.

[73] Assignee: Navistar International Transportation Corp., Chicago, Ill.

[21] Appl. No.: 340,327

[22] Filed: Apr. 19, 1989

[51] Int. Cl.⁵ .......................... B60R 1/06; G02B 5/08
[52] U.S. Cl. .................................... 350/637; 350/632; 248/481; 248/483
[58] Field of Search ............... 350/633, 634, 636, 637, 350/632; 248/481, 483; 403/122, 128

[56] References Cited

U.S. PATENT DOCUMENTS

| 3,434,688 | 3/1969 | Engelmann | 248/483 |
| 4,094,591 | 6/1978 | Lafont | 350/636 |
| 4,151,757 | 5/1979 | Pitrat | 74/501 M |
| 4,167,306 | 9/1979 | Longland | 350/636 |
| 4,651,965 | 3/1987 | Vigna et al. | 248/483 |

FOREIGN PATENT DOCUMENTS

| 494386 | 9/1950 | Belgium | 248/483 |
| 0022244 | 2/1977 | Japan | 350/637 |
| 0179349 | 9/1985 | Japan | 350/637 |

Primary Examiner—Bruce Y. Arnold
Assistant Examiner—R. D. Shafer
Attorney, Agent, or Firm—F. David AuBuchon; Dennis K. Sullivan

[57] ABSTRACT

A side view mirror assembly having a housing and a spring biased mirror installed within the housing, the mirror having its reflecting surface facing outwardly of the housing, and a mirror orientation adjusting assembly including a pair of nested hemispheres detachably engaged for limited movement one relative to the other, one of said hemispheres having the mirror secured thereto, a clamp including a high strength spring arranged to immobilize said hemispheres in an effectively locked condition, and an electromagnet disposed when energized to reduce the effective force of the spring on the clamp so as to permit limited movement of the mirror carrying hemisphere for adjusting the orientation thereof. A suitable switch is coupled between the electromagnet and the vehicle battery, the ignition switch of the vehicle being interposed between said first mentioned switch and the vehicle battery. The adjustment can be manually effected or motorized with suitable electric motors being appropriately coupled to the hemisphere.

11 Claims, 4 Drawing Sheets

FIG_1

SPRING BIASED MIRROR ASSEMBLY WITH ELECTROMAGNETIC RELEASE MEANS

CROSS REFERENCE TO RELATED APPLICATION

This application is related to U.S. Pat. application Ser. No. 07/342,502 filed by David A. Stensland and assigned the assignee hereof.

BACKGROUND OF THE INVENTION

This invention relates generally to side view mirror assemblies of the type employed for vehicles and, more particularly, provides a spring biased mirror assembly having means for adjusting the orientation of the mirror selectively characterized by the provision of electromagnetic release means enabling such adjustment.

Conventional side view mirror assemblies for vehicles include a housing, means for securing the housing to the vehicle, a mirror mounting structure secured interior of the housing, mirror support means and adjusting means intermediate the mirror support and the mirror mounting structure for selectively controlling the orientation of the mirror. These assemblies further include spring biased clamping means for maintaining the mirror in a set orientation against undesired change from the set orientation.

It has been found that in normal use vibrations from engine operation, wind, road surface conditions, etc. tend to loosen the clamp means with resultant displacement of the mirror glass from the desired orientation. The ordinary spring load may be fully or partially overcome. This condition permits vibration of the mirror supporting structure or parts thereof with complementary vibration of the mirror surface contributing to blurring or distortion of the mirror image without affecting dislodgement of the mirror glass. Misorientation of the mirror support means and other involuntary adjustments of the mirror from its set orientation are also encountered. In the present invention, this effect is overcome by increasing the strength of the spring component of the clamping means to minimize the vibrational backlash between the mechanical elements of the assembly and hence relatively strong springs have been utilized. These high load springs are selected to possess sufficient strength normally to prevent making any orientation adjustments, even desirable adjustments. Yet, the present invention enables limited manipulation of the mirror to permit positional adjustments without reducing the normal load strength of the spring component of the clamping means and reduces the chances of the adjusted position being inadvertently changed by closing of the vehicle door or when the vehicle is involved in a collision of a minor nature. It further provides for such manipulation without significant increase in cost or operation.

SUMMARY OF THE INVENTION

This invention provides a side view mirror mounting adjusting system comprising inner and outer semispherical segments respectively carrying the mirror surface and the vehicle mount nested one within the other and detachably engaged to permit relative motion, clamping means for immobilizing the segments comprising first and second curved surface members arranged in sandwiched relationship with the semispherical segments, a connecting member securing the semispherical segments to the curved surface members, and a compression spring arranged normally to bear against the curved surface members for immobilizing the semispherical segments, and an electromagnet engaged with the spring and engagable when energized to overcome the spring sufficiently to permit only limited relative motion between the semispherical segments to effect selective orientation adjustment of the mirror.

DESCRIPTION OF THE PREFERRED EMBODIMENT

Figure 1:
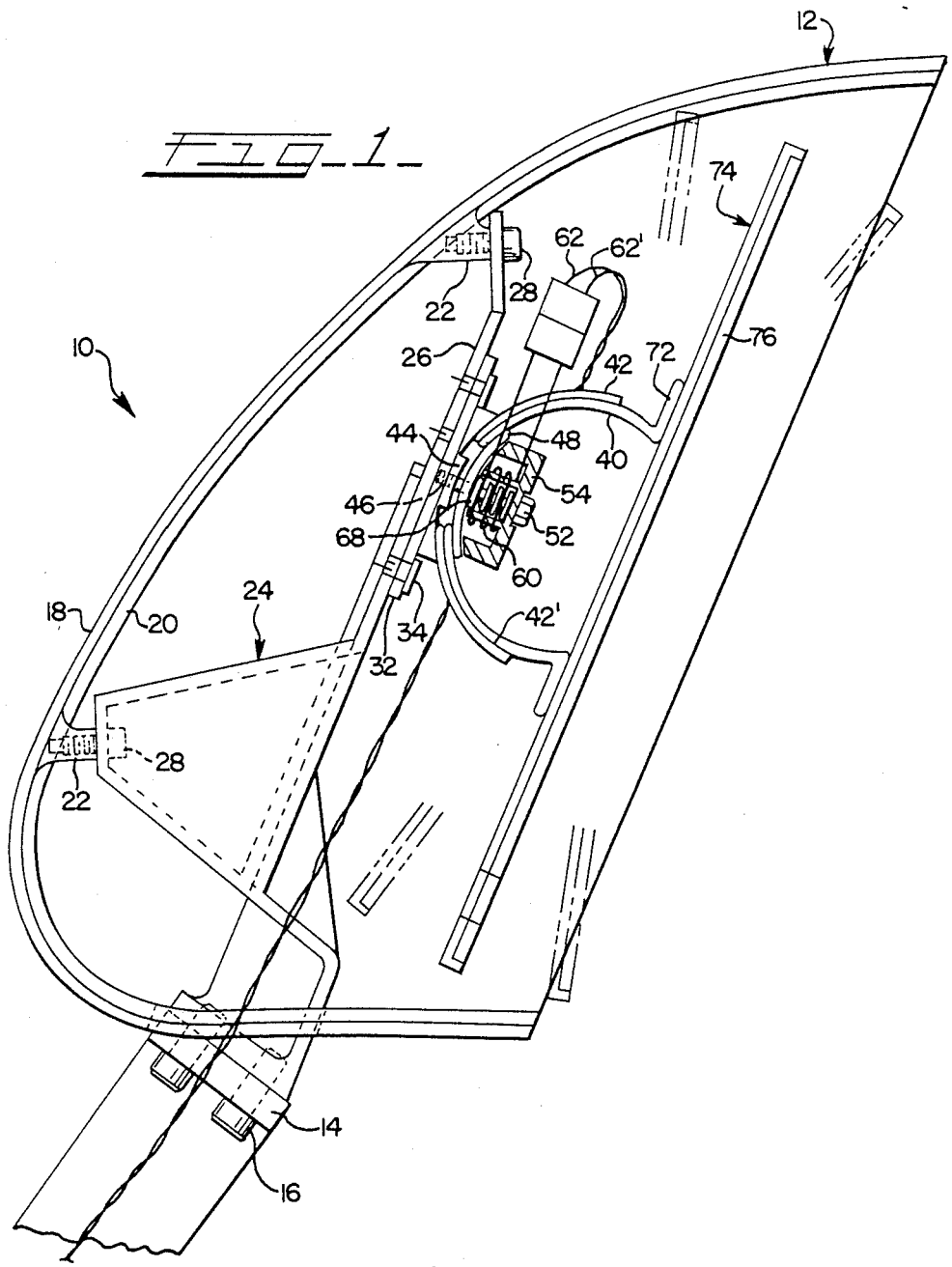
FIG. 1 is a sectional view taken through a side mirror assembly for vehicle use illustrating the mirror adjusting means according to the invention installed therein.

Referring to the drawings, there is illustrated a side view mirror assembly for vehicles characterized by the provision of a heavy duty spring employed to lock the mirror of the assembly in a fixed orientation, the invention providing an electromagnet disposed relative to the spring whereby when energized to reduce the effective holding force of the spring so that the operator is permitted to adjust the orientation of the mirror manually or by other means such as an electric motor operating thereon. Once the adjustment has been completed, the electromagnet is deenergized and the spring again will immobilize the mirror at its adjusted disposition. Since electric current is employed only while the mirror is being adjusted, the loading on the electrical system, particularly on the power source, is significantly reduced. When the ignition switch of the vehicle is turned off, the mirror lock will not be released; consequently, the mirror will be less likely to be dislodged from its adjusted position When the vehicle door is opened and shut or the vehicle is involved in a minor collision.

Figure 2:
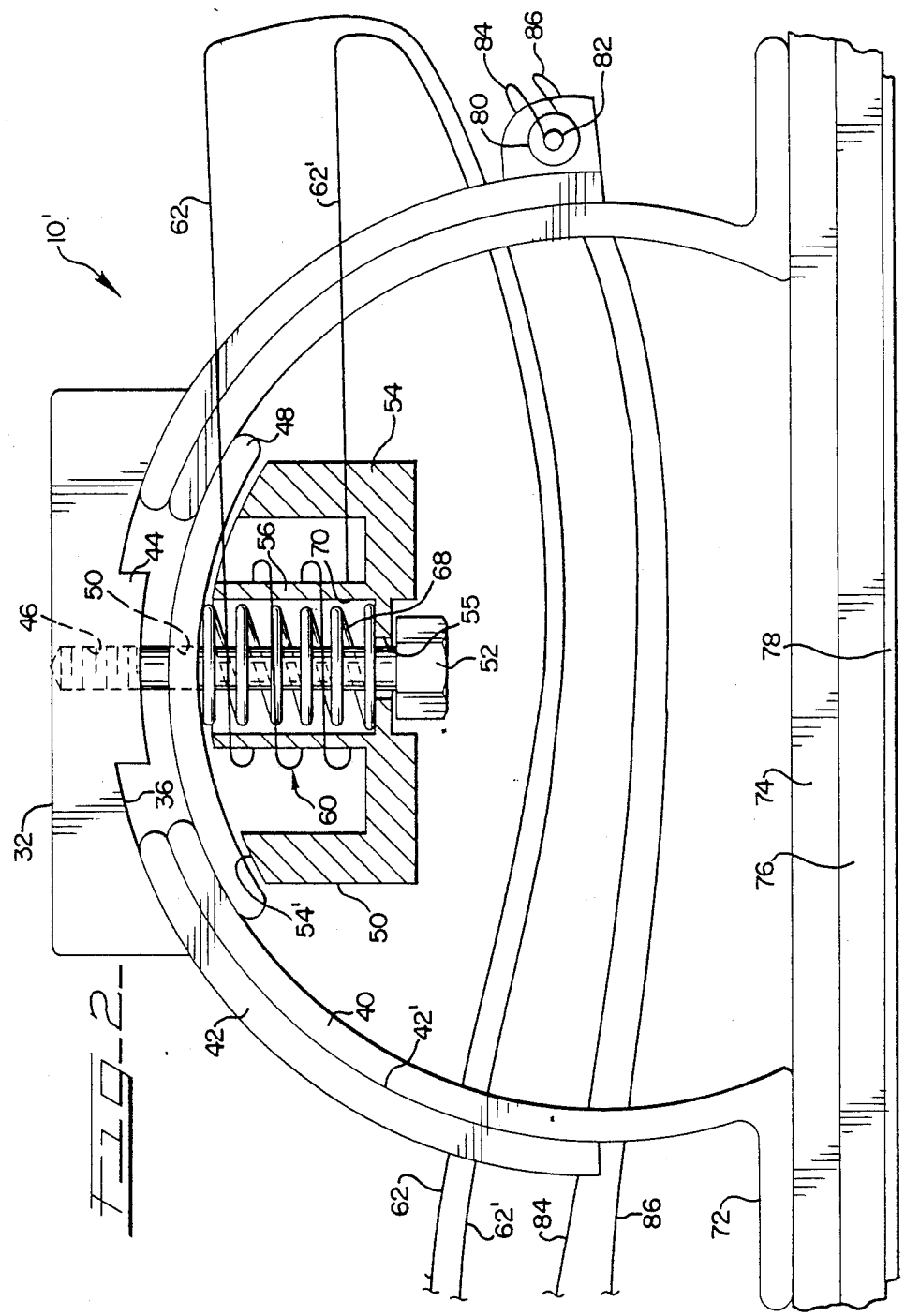
FIG. 2 is an enlarged sectional view of the mirror support and mirror assembly of FIG. 1.

Referring now to the drawing, a side mirror assembly for a vehicle is illustrated in FIG. 1, and designated generally by reference character 10. The side mirror assembly 10 comprises a housing 12 secured to the vehicle (not shown) by a bracket 14 and bolts 16. The housing 12 is formed of an outer shell 18 and an inner shell 20 of conforming configuration and having bolt receiving posts 22. A brace 24, including supporting bridge 26, is secured to the posts 22 by bolts 28 and includes a section to which a mounting bracket 32 is secured by bolts 34. The mounting bracket 32 has a concave surface 36 opening outwardly and being formed with a radius of curvature selected to be substantially similar to the radii of curvature of semispherical mounting elements 40, 42 which are nested one within the other. Preferably, the mounting elements 40 and 42 are formed as hemispheres. The inner hemisphere 40 is clamped in surface to surface engagement with the outer hemisphere 42 in their nested arrangement. As best seen in FIG. 2, the mounting bracket 32 is provided with a central land 44 carrying threaded passage 46. A curved clamping segment 48 is provided with a central passage 50. An electromagnet 54 is loosely connected by bolt 52 to the mounting bracket 32, the bolt 52 being accommodated through the passage 55. The electromagnet 54 has a central hollow core element 56 and an outer circumferential wall 58. The core 56 carries an outer electrical coil winding 60, the winding being coupled through leads 62, 62' to an exterior source of electrical power, such as the vehicle battery 65, via first and second electrical switches 64 and 66 (FIG. 3), the second switch 66 functioning as the ignition switch of the vehicle. A high strength spring 68 is seated within the hollow chamber 70 of core 56, its force bearing upon the clamping segment 48 and forcing it tightly against the inner hemisphere 40 and causing the inner hemisphere 40 to engage the inner surface 42' of the outer hemisphere 42 to force both tightly engaged hemispheres 40, 42 against the concave surface 36 when the bolt 52 is tightened to impose the preload on spring 68. The outer circumferential wall 58 of the electromagnet 54 has a curved end portion 54' which engages the clamping segment 48 but is spaced fractionally therefrom so that there is a fractional space therebetween when the spring load of spring 68 is overcome when the electromagnet 54 is energized. This allows the inner hemisphere 40 to be moved relative to the outer hemisphere 42. The inner hemisphere 40 is provided with an outwardly directed circumferential rim 72. A mirror-mounting bed 74 is secured to the circumferential rim 72 and opens outward for receiving a glass mirror 76 secured therein, as by adhesive, the reflective surface 78 thereof facing outward. Thus, upon energization of the electromagnet 54, the mirror-mounting bed 74 can be moved about its axis to assume varied orientation (see the phantom representations).

In FIG. 2, the mirror adjusting system of side view mirror assembly 10' is illustrated. The adjusting system of the assembly 10' includes electric motors 80 and 82 are mounted on the lip of hemisphere 42 and provides for mounted on the motorized adjustment about the axes of thereof while the mirror bed 74 is adjustable when the electromagnet 54 is energized and the effective force of the spring 68 acting between the clamping segment 48 and the hemispheres 40 and 42 is reduced. As mentioned, deenergization of the electromagnet 54 returns the full spring load to be applied against the clamping segment 48 locking the mirror bed 74 in place. As shown in FIG. 1, the leads 62, 62' from the electromagnet coil 60 run through the mounting bracket 14 to the switch 64' interior of the vehicle.

Figure 3:
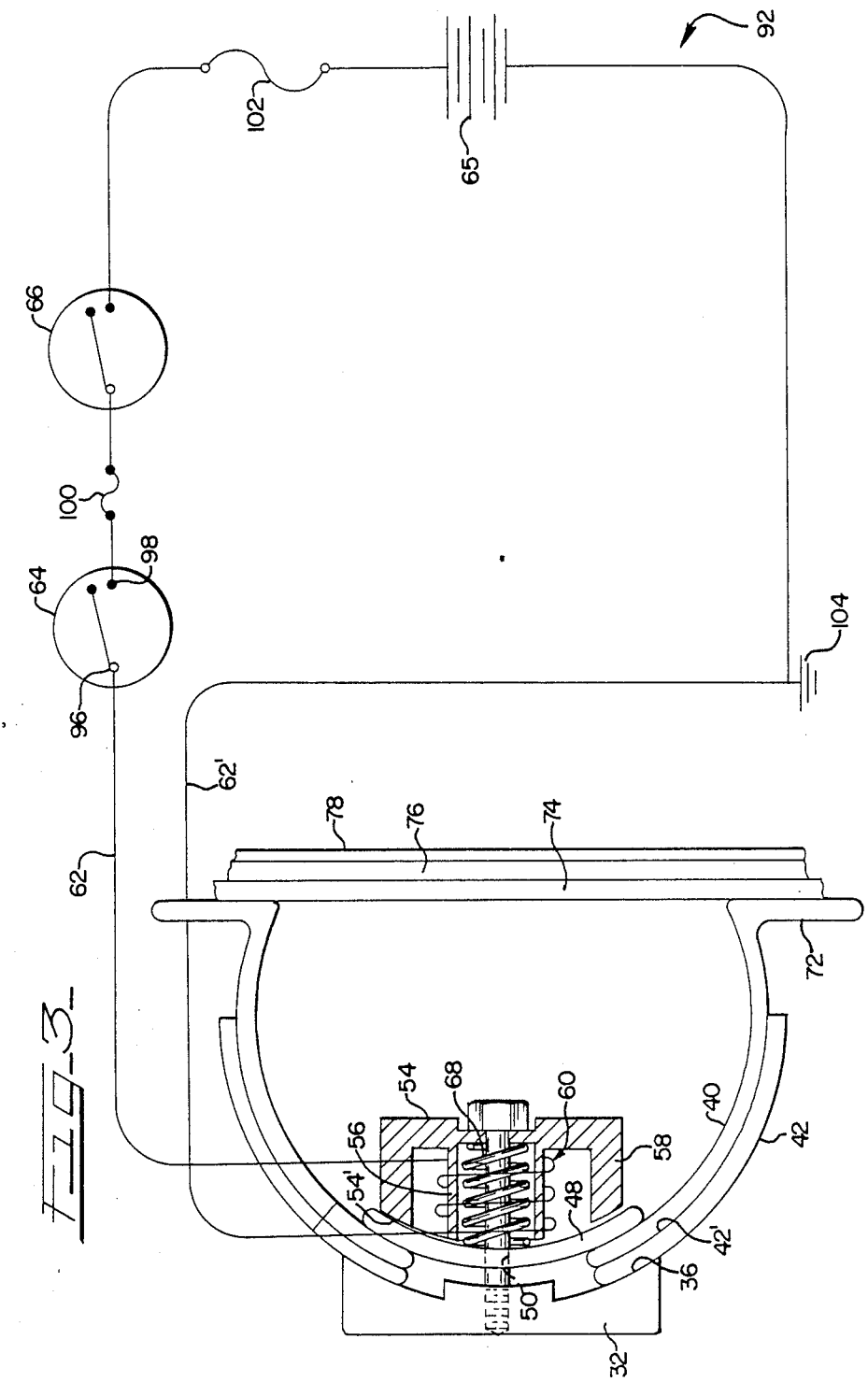
FIG. 3 is an electrical schematic representation illustrating the operation of the side mirror assembly having the mirror adjusting assembly according to the invention installed therein.

Referring to FIG. 3, there is shown an electrical schematic representation of the non-motorized embodiment of the invention, wherein the same reference characters represent the components of the invention as described hereinabove. The electrical circuit is designated generally by reference character 92 and wherein the electrical lead 62 from electrical coil 60 is connected to the pole 96 of switch 64 while pole 98 of switch 64 is connected through fuse 100 to the ignition switch 66, in turn connected through fuse 102 to the source of electrical power, the 12 volt battery 65. The other lead 62' of the coil 60 is connected to ground 104. The circuit 92 is closed to energize the electromagnet 54, hence causing the spring 68 to be compressed further and thus permitting the mirror to be adjusted. Opening of switch 64 deenergizes the electromagnet 54, causing the full strength of the spring 68 to immobilize the pair of hemispheres 40 and 42, locking the mirror bed 74 and mirror 76 in the adjusted orientation.

Figure 4:
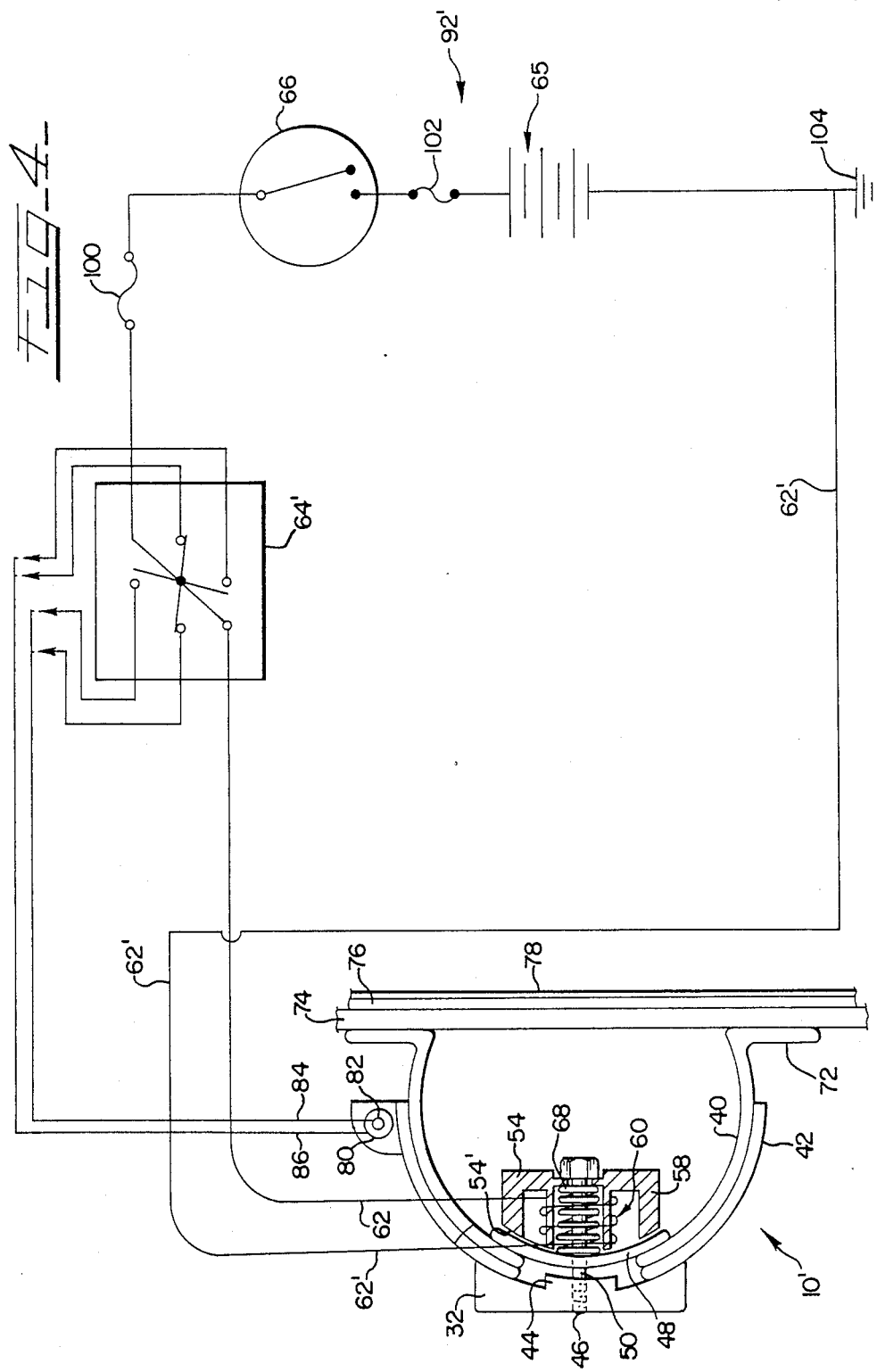
FIG. 4 is an electrical schematic representation illustrating the operation of a modified embodiment of the invention.

In FIG. 4, there is illustrated an electrical circuit 92' for operating the modified embodiment of the invention which employs electric motors 80, 82 to cause relative movement of the hemispheres 40, 42 when the electromagnet 54 is energized. Here, the electrical leads 84, 86 are connected to multipole switch 64'. The similarity of operation to circuit 92 is obvious, equivalent reference characters being employed.

It is contemplated that alternate structures and variations can be devised without departing from the spirit and scope of the invention as set forth in the appended claims.

What we claim is:

1. A mirror assembly comprising a housing opening at one end thereof, a support structure within said housing, a mirror disposed within said housing, said mirror having a reflective surface facing outwardly of said housing, mounting means within said housing for mounting said mirror to said support structure, means fixing the orientation of said mirror, adjusting means secured between said support structure and said mirror for selectively changing the orientation of said mirror, said mounting means including a pair of nested arcuate elements arranged for movement one relative to the other, said mirror being mounted on one of said nested arcuate elements, said fixing means comprising resiliently biased clamping means arranged for immobilizing said pair of nested arcuate elements, said clamping means including a clamping element and resilient biasing means arranged to bear against said clamping element, and said adjusting means comprising an electromagnet operatively engaging said resilient biasing means, a source of electrical power, and switch means between said electromagnet and said source of electrical power for selectively energizing and deenergizing said electromagnet, said electromagnet when energized reducing the clamping force normally effected by said resilient biasing means between said nested arcuate elements an amount sufficient to permit limited movement of one of nested arcuate elements to enable change in the orientation of said mirror and when deenergized maintaining said mirror in an effectively locked orientation.

2. The mirror assembly as claimed in claim 1 in which said mounting elements comprise a pair of nested semispherical segment having substantially identical radii of curvature, one of said segments having said mirror secured thereto.

3. The mirror assembly as claimed in claim 2 in which said nested semispherical segments comprise a pair of hemispheres, one of said hemispheres having an outer rim for securing said mirror thereto.

4. The mirror assembly as claimed in claim 1 in which said resilient biasing means comprise a high strength compression spring.

5. The mirror assembly as claimed in claim 1 in which said electromagnet includes a hollow core element and said resilient biasing means comprise a high strength spring seated within said core element and an electrical winding carried by said core element encompassing said spring.

6. The mirror assembly as claimed in claim 1, in which said mounting elements comprise semispherical segments having substantially similar radii of curvature, said segments arranged sandwiched between said supporting structure and said clamping element, said electromagnet arranged adjacent said clamping element and having a hollow core portion, said resilient biasing means comprising a high strength spring arranged within said hollow core portion and bearing against said clamping element, said clamping element being arcuate and having a radius of curvature substantially similar to the radii of curvature of said elements, an electrical coil mounted on said core portion whereby upon said electromagnet being energized, the bias of said spring is overcome sufficient to release said clamping element and permit limited movement of one of said segments on which said mirror is mounted.

7. The mirror assembly as claimed in claim 1 and electric motor means operably coupled to said power source and to one of said mounting elements for effecting movement of said mirror about its axis when said electromagnet is energized.

8. A mirror glass adjustment system comprising inner and outer mounting elements arranged in close proximity, at least one of said elements being movable selectively one relative to the other and having a mirror secured thereto for movement therewith, resiliently biased clamping means for releasably coupling said mounting elements one to the other, said clamping means including a high strength spring for immobilizing said mounting elements under normal conditions, and electromagnetic means operatively associated with said clamping means for reducing the clamping force exerted thereby to release said mounting elements to permit limited relative movement thereof, a source of electrical power, and switch means connected between said source of electrical power and said electromagnet means for selectively energizing and deenergizing said electromagnet means to enable the orientation of said mirror to be respectively adjusted and immobilized.

9. The system as claimed in claim 8 in which said mounting elements comprise ,a pair of nested spherical segments, one of said segments having a peripheral rim and said mirror being secured to said rim.

10. The system as claimed in claim 9, in which said mirror includes a mirror bed and a mirror glass secured to said mirror bed with the reflective surface thereof facing outward.

11. In a side view mirror assembly particularly for vehicles, including a housing, a support structure within said housing, a mirror disposed within said housing, means for mounting said mirror to said support structure including a pair of nested elements arranged for relative movement, said clamp means, including a spring for immobilizing said nested elements, the improvement comprising means for selectively adjusting the orientation of said mirror, said adjusting means comprising an electromagnet operable with said clamp means when energized to reduce the clamping force of said clamp means and release said mirror for limited movement, said spring being of sufficient strength, upon said electromagnet being deenergized, to maintain said mirror in an effectively locked condition.

* * * * *